Sept. 17, 1935. L. H. SMITH 2,014,456
PLOW
Filed March 19, 1934
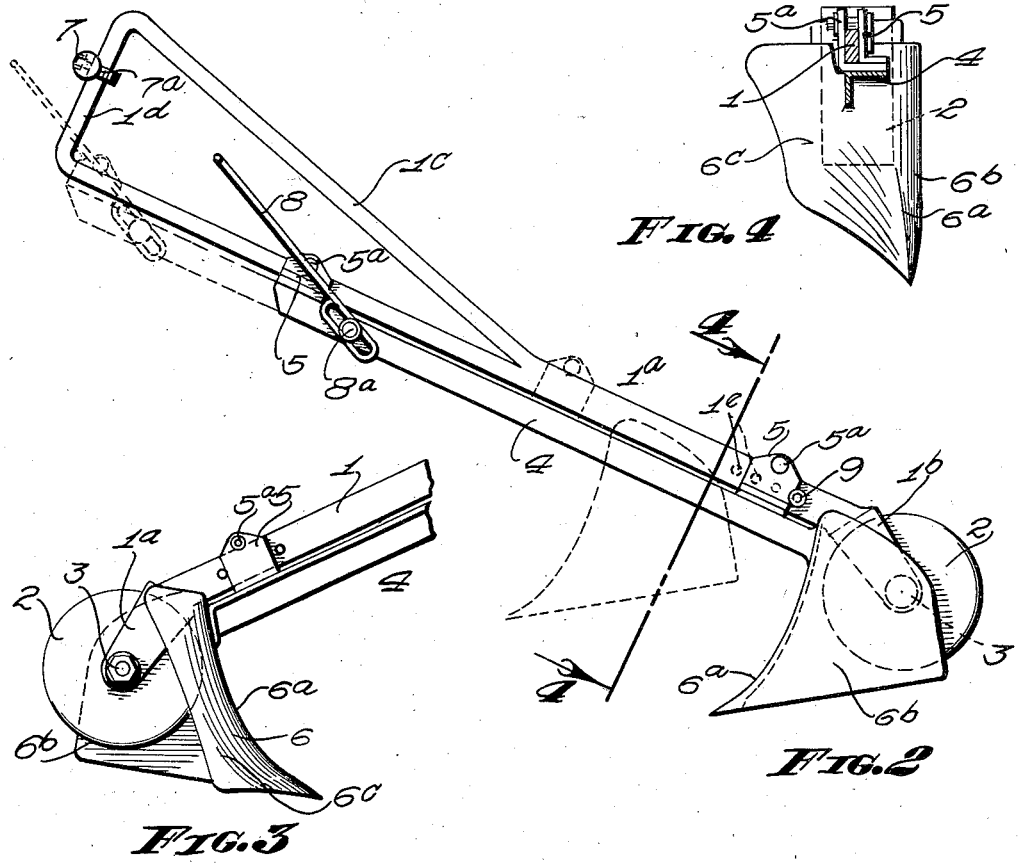
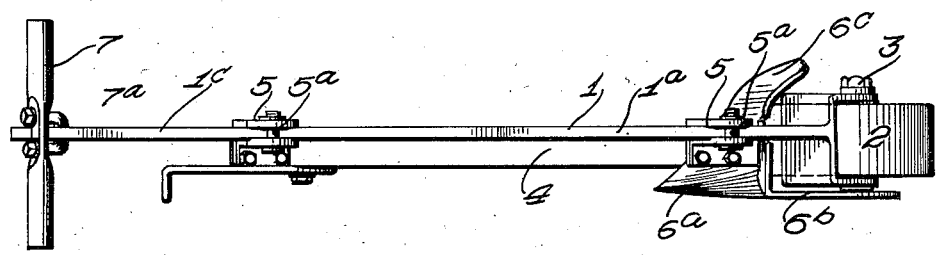
Inventor
LOUIS H. SMITH
By A. B. Bowman
Attorney Patented Sept. 17, 1935

2,014,456

UNITED STATES PATENT OFFICE 2,014,456

PLOW

Louis H. Smith, El Cajon, Calif.

Application March 19, 1934, Serial No. 716,342

5 Claims. (Cl. 97—59)

My invention relates to plows, and the objects of my invention are:

First, to provide a plow which is adapted to be operated by hand;

Second, to provide a hand operated plow which is so arranged that the operator pulls the plow, that is, the operator walks in front of the plow and therefore clear of the furrow he forms thereby;

Third, to provide a plow of this class which is so arranged that the plow point enters the earth a pre-determined distance and tends to maintain a constant depth during its operation;

Fourth, to provide a plow of this class which incorporates a novel weighting and transporting wheel which when the plow is in operation acts as a weight to hold the plow in the ground but when desired may be used to support the plow above the ground for the purpose of transportation;

Fifth, to provide a plow of this class which is particularly adaptable for plowing around trees or the like where roots may be encountered inasmuch as the plow may be readily and quickly backed away from the roots and raised over the roots without undue effort on the part of the operator;

Sixth, to provide a plow of this class which tends to maintain itself in an upright and operating position and by reason of the position of the operator relative to the plow point tends to plow in a straight line, all without extra effort on the part of the operator, and Seventh, to provide on the whole a novelty constructed hand-drawn plow which is particularly simple and economical of manufacture proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a top or plan view of the plow in the position assumed for operation; Fig. 2 is a side elevational view thereof showing by dotted lines the position of the plow element when in a position for transportation; Fig. 3 is a fragmentary side elevational view of the plow taken in the opposite direction from Fig. 2; and Fig. 4 is a transverse sectional view through 4—4 of Fig. 2 viewed along the axis of the drawing bar.

Drawing bar 1, weight wheel 2, axle pin 3, slide bar 4, guides 5, plow element 6, handle bar 7, extension arm 8, and pin 9, constitute the principal parts and portions of my novel plow.

A drawing bar 1 is provided which comprises a main guiding portion 1a, a yoke 1b at its rearward or lower end which is directed downwardly at an angle with the normal axis of the drawing bar, and a triangular frame portion 1c at the forward or upper end of the portion 1a. The yoke 1b is relatively wide and receives a wide heavy weight wheel 2 having an axle pin 3 extending therethrough and secured in the extremities of the yoke 1b.

One side of the frame 1c forms a continuation of the main guide portion 1a. Mounted longitudinally with the main guide portion 1a and the above mentioned side of the frame is a slide bar 4 which is suspended therefrom by a pair of guides 5 having portions embracing the sides of the drawing bar and each having a pin 5a extending over the upper edge of the drawing bar to retain the slide bar in slidable relation with the drawing bar.

A plow element 6 is rigidly secured to the lower end of the slide bar 4. The plow element includes a share 6a at one side of which is a relatively high landside 6b which is disposed vertically and adapted to extend along one side and contiguous to the weight wheel 2 when the plow is in its operating position, as shown in Figs. 1, 2 and 3. The plow element is also provided with a mold board 6c which extends across the forward side of the wheel 2 and with its extremity curved partially around the side of the wheel opposite from the landside 6b.

The frame 1c includes a shorter side, designated 1d, disposed at the extremity of the draw bar at substantially right angles therewith. This portion receives a handle bar 7 which extends transversely. The handle bar 7 is adjustably secured to the portion 1d by a yoke 7a so that the height of the handle bar may be varied. The upper end of the slide bar 4 is provided with an extension arm 8 secured by a bolt 8a so that its position relative to the slide bar may be adjusted.

The lower or rearward position of the plow element with respect to the wheel is variously determined by means of a pin 9 which fits in any one of a series of holes 1e provided in the drawing bar 1. The pin 9 is engaged by the lower guide 5, as shown in Fig. 2.

Operation of my plow is as follows: The handle bar 7 is adjusted so that the operator walking backward and pulling thereon pulls straight from the shoulders when the plow is operating at the desired depth. By adjusting the handle bar 7 the plow may be operated by persons of different height and such adjustment may also be used to regulate the depth to which the plow enters the ground. Further adjustment may be made by means of the pin 9. As the operator walks backwardly pulling the plow after him, this action automatically causes the plow element to move rearwardly until stopped by the pin 9 and consequently elevates the wheel 2 until it is clear of the ground; it being noted that the wheel occupies the space formed by the furrow and in such position acts as a weight to maintain the plow in the ground. The plow element is of course held in the ground also by reason of the shape of the plow share and mold board. If it is desired to lift the plow element over an obstruction, it is merely necessary to push backwardly on the handle which causes the wheel 2 to move rearwardly and downwardly until it engages the ground, whereupon the operator raises the handle 7 and consequently the plow element to clear the obstruction, or may back away from the obstruction and then lift over it. As soon as the plow again engages the earth the wheel 2 is automatically drawn forward and clear of the ground. All this may be accomplished without operating the arm 8. Further control in this respect is obtained by manually shifting the slide bar by means of the extension arm 8. The extension arm 8 is used particularly when transporting the plow from one position to another in that the plow is pulled forwardly to the dotted line position well clear of the ground.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A plow comprising, a draw bar, a drawing handle at its forward end, a weight wheel at its opposite end, a slide bar carried by said draw bar, and a plow element slidable with the slide bar and disposed forwardly of the weight wheel, said draw bar and slide bar occupying an inclined position when in operation whereby sliding movement of the plow element raises and lowers the same with respect to the weight wheel.

2. A plow comprising, a draw bar, a drawing handle at its forward end, a weight wheel at its opposite end, a slide bar carried by said draw bar, and a plow element slidable with the slide bar and disposed forwardly of the weight wheel, said draw bar and slide bar occupying an inclined position when in operation whereby sliding movement of the plow element raises and lowers the same with respect to the weight wheel, said plow element comprising a landside adapted to partially cover one side of the wheel, a share forwardly of the wheel, and a mold board traversing and shielding the forward side of the weight wheel.

3. A hand plow comprising, relatively slidable bars, a weight wheel carried by one bar, and a plow element carried by the other bar and disposed forwardly of the weight wheel, said bars occupying an inclined position when in operation whereby relative movement raises and lowers the plow with respect to the wheel.

4. A hand plow comprising, relatively slidable bars, a weight wheel carried by one bar, a plow element carried by the other bar, and disposed forwardly of the weight wheel, said bars occupying an inclined position when in operation whereby relative movement raises and lowers the plow with respect to the wheel, said plow element comprising a landside adapted to partially cover one side of the wheel, a share forwardly of the wheel, and a mold board traversing and shielding the forward side of the weight wheel.

5. A hand operable garden implement comprising, relatively slidable bars, a weight wheel carried by one bar, a ground working device carried by the other bar and disposed forwardly of the weight wheel, said bars having an inclined operating position whereby relative movement raises and lowers the ground working device with respect to the wheel.

LOUIS H. SMITH.